B. T. BABBITT.
Rotary Blowing Apparatus.

No. 220,107. Patented Sept. 30, 1879.

UNITED STATES PATENT OFFICE.

BENJAMIN T. BABBITT, OF NEW YORK, N. Y.

IMPROVEMENT IN ROTARY BLOWING APPARATUS.

Specification forming part of Letters Patent No. 220,107, dated September 30, 1879; application filed April 10, 1879.

*To all whom it may concern:*

Be it known that I, BENJAMIN T. BABBITT, of the city and State of New York, have invented certain new and useful Improvements in Rotary Blowing Apparatus, of which the following is a full, clear, and exact description, reference being had to the accompanying drawings, which form part of this specification.

This invention consists in a pair of overhanging rotary blowers upon the ends of a rotating engine-shaft, whereby a balancing action is obtained for said blowers upon said shaft, and special bearings for the blowers are dispensed with.

It also consists in a combination, with a pair of overhanging rotary blowers upon the ends of a rotating engine-shaft, of a rotary engine upon said shaft interposed between said blowers, whereby not only a balancing action is obtained for said blowers upon said shaft and special bearings for the blowers are dispensed with, but the engine which drives said overhanging blowers is directly applied between the latter to the shaft which operates them.

Figure 1:
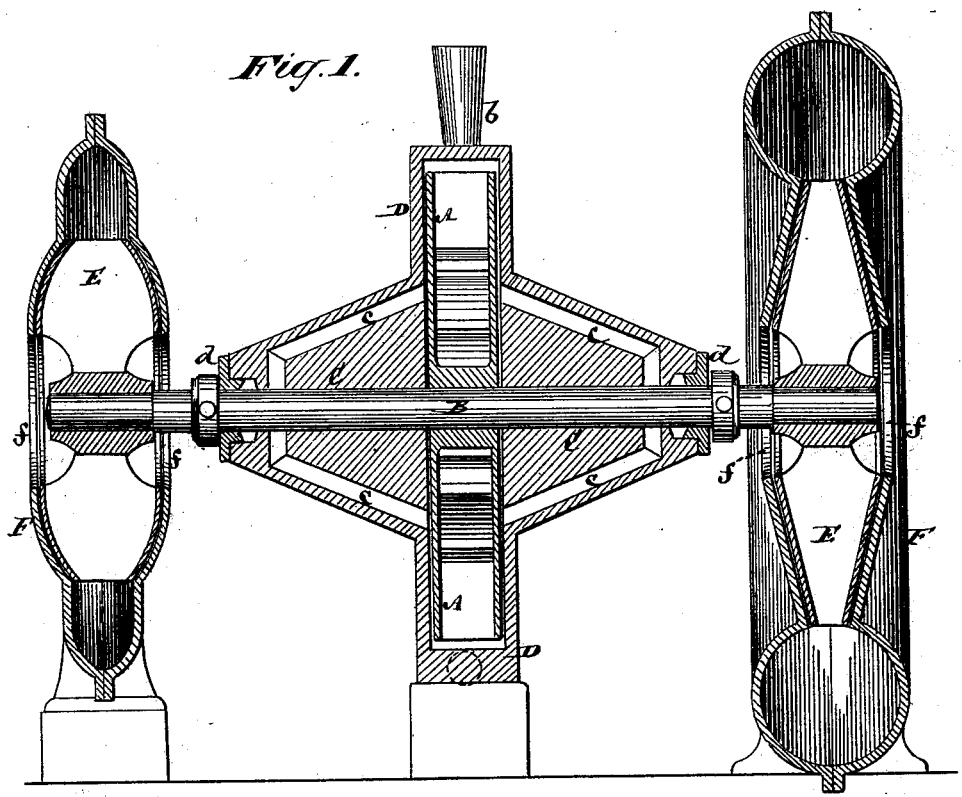
Figure 2:
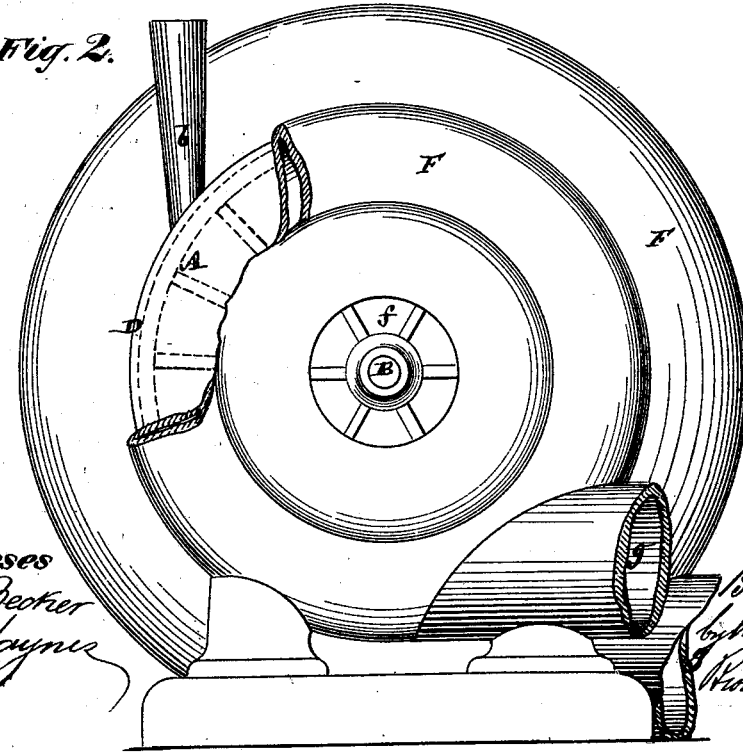

In the accompanying drawings, Figure 1 represents a vertical section, in direction of the length of the engine-shaft, of a pair of rotary blowers and interposed rotary engine for operating said blowers in accordance with my invention; and Fig. 2, a broken side view of the same.

A is a bucket-wheel of a rotary engine, designed to be propelled by steam, compressed air, gas, or water, but preferably by a fluid which will have a lubricating action upon the shaft B of the wheel and its bearings C C. Said wheel is arranged to rotate within a cylinder or case, D, having an inlet, b, for the motive agent, and a suitable outlet after said agent has performed its duty on the buckets of the wheel; also channels c for the passage of the propelling-fluid through the bearings C C, forming part of the cylinder D, to the shaft B, which latter passes out through stuffing-boxes d d at the outer ends of said bearings.

Fast on the outer ends of the engine-shaft B, preferably at an equal distance from the bearings C C, so as to have a balancing action or effect on said shaft, and thereby providing for an easy run of the latter, are two blowers or blowing-wheels, E E, of any suitable construction, arranged to rotate within cases or chambers F F, which have openings $f$ in their centers to supply air to the wheels E E, that have a centrifugal action or effect, and discharge the air so received through suitable outlets $g$ $g$.

Such rotary blowing apparatus combines great compactness with extreme simplicity and very little friction.

I claim—

1. The combination, with a rotating engine-shaft and bearings supporting said shaft, of rotary blowers or blowing-wheels fast on the overhanging ends of said shaft outside of or beyond said bearings, whereby special bearings for the blowers are dispensed with and the blowers have a balancing action or effect on said shaft, substantially as specified.

2. The combination, with a rotating engine-shaft, its bearings, and rotary blowers on the overhanging ends of said shaft outside of said bearings, of a rotary engine upon or directly applied to said shaft between the blowers, essentially as and for the purposes shown and described.

B. T. BABBITT.

Witnesses:
L. BABBITT,
D. J. NEWLAND.